United States Patent [19]

Wood

[11] 4,375,028
[45] Feb. 22, 1983

[54] ELECTRIC KETTLE

[75] Inventor: Paul A. P. Wood, Richmond, England

[73] Assignee: Pifco Limited, Manchester, England

[21] Appl. No.: 249,528

[22] Filed: Mar. 31, 1981

[30] Foreign Application Priority Data

Apr. 1, 1980 [GB] United Kingdom ................ 8010875
Apr. 24, 1980 [GB] United Kingdom ................ 8013549
Sep. 27, 1980 [GB] United Kingdom ................ 8031304

[51] Int. Cl.³ ............................................. F27D 11/02
[52] U.S. Cl. ...................................... 219/441; 99/331; 99/342; 219/435; 219/437; 219/494
[58] Field of Search ............... 219/336, 435, 436, 437, 219/438, 439, 441, 442, 494; 174/135; 116/118 R; 99/332, 333, 331, 342; 126/388; 73/322

[56] References Cited

U.S. PATENT DOCUMENTS

| 1,887,280 | 11/1932 | Biancalana | 219/437 |
| 2,923,804 | 2/1960 | Neuert | 219/437 X |
| 3,467,816 | 9/1969 | Wahlberg | 219/437 |
| 3,487,200 | 12/1969 | Waller et al. | 219/437 |
| 3,725,643 | 4/1973 | Clausse | 219/441 |
| 3,848,563 | 11/1974 | Brown | 116/118 R |

FOREIGN PATENT DOCUMENTS 1293956  11/1972  United Kingdom ................ 219/437

Primary Examiner—Volodymyr Y. Mayewsky
Attorney, Agent, or Firm—Sughrue, Mion, Zinn, Macpeak and Seas

[57] ABSTRACT

An electric kettle comprises a bowl closable by a lid. An electric element is connected to the lid and is thereby suspended within the bowl. A spout is provided for pouring and through which the bowl can be filled with water. Means are also provided for the connection of the element to an electricity supply.

11 Claims, 6 Drawing Figures

FIG. 1

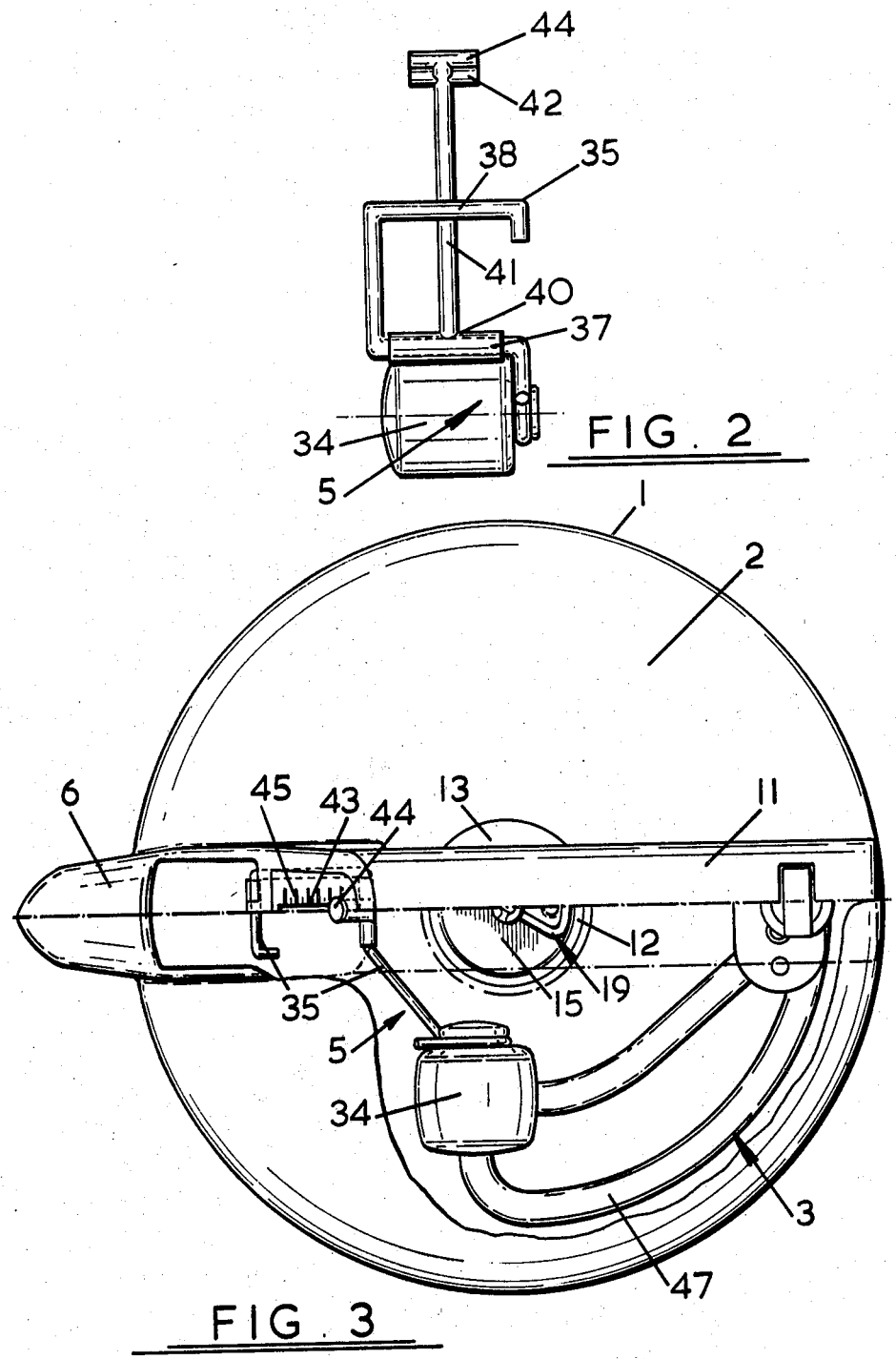

ELECTRIC KETTLE

The present invention relates to an electric kettle.

Conventional electric kettles comprise a body with a bowl in which an electric element is fitted for connection to a mains electricity supply via a socket arrangement provided on the exterior surface of the bowl. The bowl of the kettle can usually be filled with water through an opening closable by a detachable lid.

According to the present invention there is provided an electric kettle comprising a bowl closable by a lid, a spout, and an electrical element located within the bowl with means provided whereby the element can be connected to an electricity supply, characterised in that the element is connected to the lid and is suspended within the bowl when the lid is fitted on the kettle leaving the spout through which the bowl can be filled with water.

This invention has several advantages over conventional kettles. The attachment of the element to the lid enables the bowl to be easily manufactured and to be completely emptied for cleaning purposes. Additionally, the fact that the element is connected to the lid gives easy access to the element when the lid is detached from the bowl for repair or replacement.

Preferably, a cut-out arrangement comprising a switch is provided via which the element is connected to and disconnected from the electricity supply, characterised in that the switch is operable by a shape memory effect actuator which on attainment of a predetermined temperature changes its physical shape sufficiently to operate the switch and thereby prevent the element being supplied with current from the supply.

As is known, shape memory effect actuators comprise material which can undergo a thermoelastic martensite transformation as the temperature of the material is raised through the transformation point. Such an actuator is produced by shaping the aforesaid material into a required shape by the application of a macroscopic deformation to the material in its fully martensitic state so that the material is strained beyond its elastic limit and is thereby permanently deformed. On heating, the reverse transformation takes place with removal of the macroscopic deformation. Hence, on heating the material returns to the shape which it had before the macroscopic deformation took place and can be described as having a "shape memory". When the material cools, it reverts back to the shape it had after the initial macroscopic deformation. The advantage of using such a shape memory effect actuator is that the temperature at which the memory effect transformation occurs can be predetermined with accuracy and does not drift with time.

Preferably also, a water level indicator is provided for the kettle, characterised in that the indicator comprises a float located within and pivotally attached to the body of the kettle, a visible scale for indicating the level of water within the kettle, and indicator means disposed between the float and the scale whereby as the water level within the kettle varies the float pivots upwardly or downwardly and acts on said means to move same along the scale.

The present invention will now be described by way of example with reference to the accompanying drawings in which:

Figure 1:
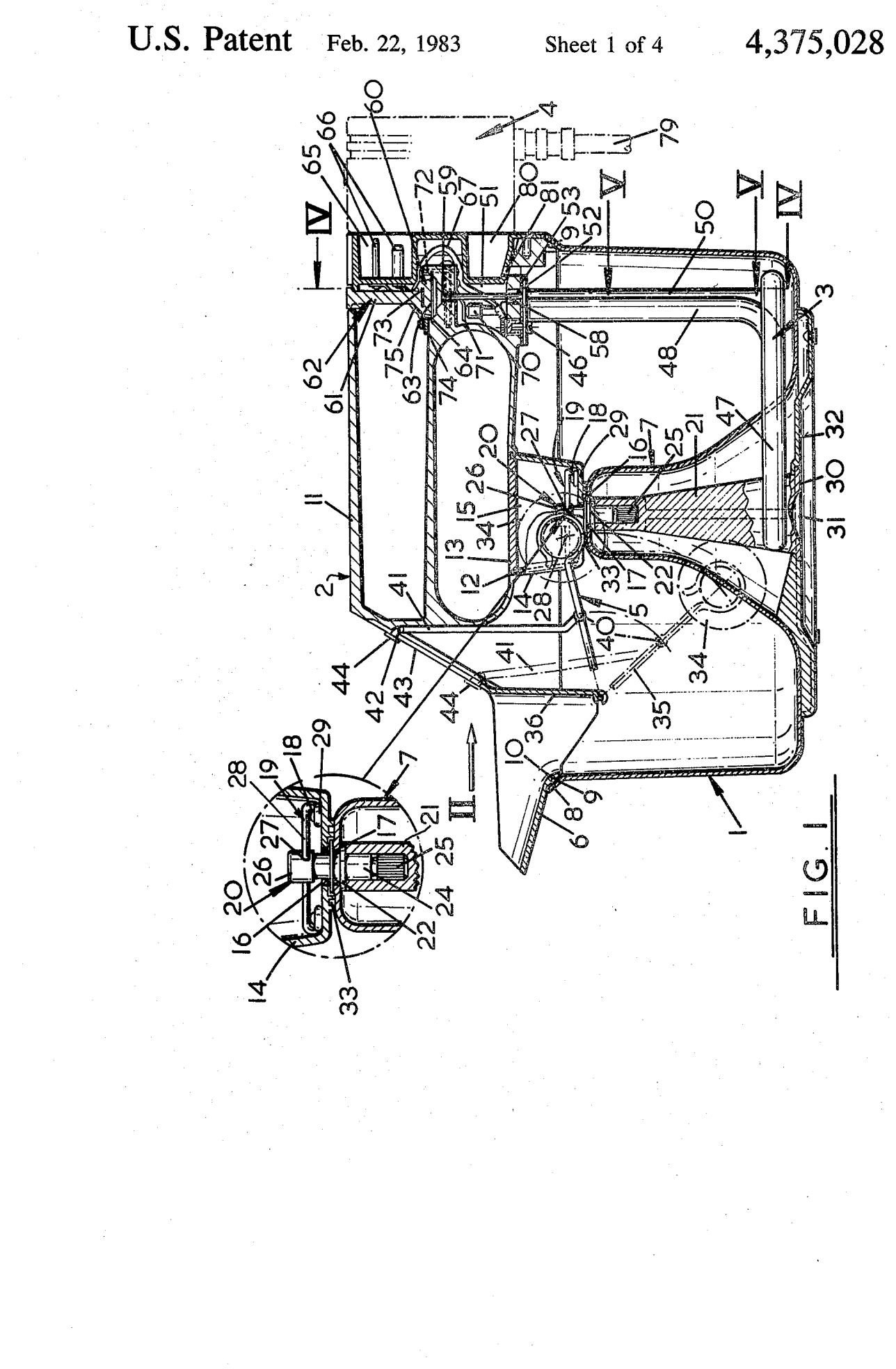

FIG. 1 is a cross-sectional view of a kettle according to the present invention;

FIG. 2 is a view in the direction of arrow II in FIG. 1 of a float arrangement comprising a water level indicator for the kettle;

FIG. 3 is a plan view of the kettle shown in FIG. 1, part of which is shown with a lid of the kettle removed;

Figure 4:
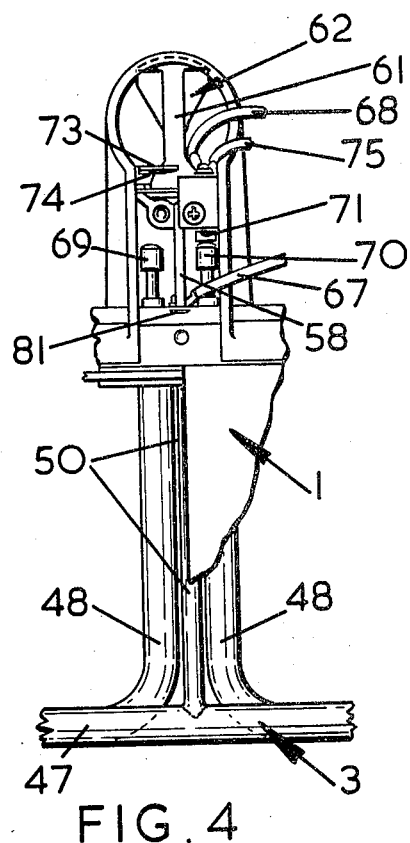
FIG. 4 is a sectional view on the line IV—IV in FIG. 1.

The kettle comprises a bowl 1 to which is fitted a detachable lid 2. An electric element 3 is connected to the lid 2 so that it is suspended within the bowl 1 when the lid 2 is fitted to the bowl 1. A socket arrangement 4 is attachable to the lid 2 in order that the element 3 can be connected to an electricity supply, the arrangement 4 comprising controls for the kettle so that the element 3 can be disconnected from the electricity supply on attainment of a predetermined temperature as is described below. In normal use of the kettle, it is intended that the lid 2 will remain connected to the bowl 1 and a water level indicator arrangement 5 is provided to indicate to the kettle user the quantity of water therein as this is only normally visible through the apertures formed by a spout 6 of the kettle.

The bowl 1 of the kettle comprises a circular metallic bowl 1 and is provided at its central region with an upraised column 7 for use in attachment of the lid 2 as is described below. The rim 8 of the bowl 1 is flared outwardly to receive the lid 2 therein and an annular sealing ring 9 is located between the lid 2 and the rim 8 to prevent egress of steam from the kettle when in use via any gap between these elements.

The lid 2 comprises a plastics moulding and is provided with an annular groove 10 around its periphery in which is located the sealing ring 9. A handle 11 is integrally formed with the lid 2 and includes a portion which forms a part of the water level indicator arrangement 5. At the centre of the lid 2 beneath the handle 3 is an aperture 12 which when the lid 2 is in position in the bowl 1 lies directly above the top of the column 7 formed in the bowl 1. This aperture 12 is covered by a plate 13 and the rim of the aperture 12 is attached to a dished member 14 to define a chamber 15, which houses the means by which the lid 2 is fastened to the bowl 1. These fastening means will now be described.

At the base of the member 14 is a circular aperture 16 which is located so as to lie directly above and in register with an aperture 17 formed in the top of the column 7 of the bowl 1. The member 14 is provided with two upraised pips 18 which are provided with enlarged heads and which project into the chamber 15 at opposite sides of the aperture 16. Spring clip 19 is snap-fitted to these pips 18 as is described below. The clip 19 also engages a member 20 that engages with the bowl 1 and in this way the lid 2 and the bowl 1 are held together, the member 20 and the clip 19 forming two complementary parts of a fastening means. This fastening means is engaged and tightened by means of a rotatable actuator 21 which causes the member 20 to act on the spring clip 19 to bias the lid 2 into tight engagement with the bowl 1.

The member 20 comprises a rod which has an annular flange 22 formed therearound of greater diameter than the diameter of the aperture 17. One end 24 of the rod 20 forms a spigot, the periphery of which is knurled as at 25, and is push fitted to engage tightly within the actuator 21 as is described below. The other end 26 of the rod 20 is bifurcate and each of the two branches thereof defines a helical groove 27 in the manner of a screw thread. The spring clip 19 has a central portion 28 which is located between the two branches at the end 26 of the rod 20 whereby on rotation of the rod 20 in one direction the portion 28 of the clip 19 is forced to travel along the helical grooves 27 to tighten the clip 19 down against the dished member 14 to hold the lid 2 and the bowl 1 tightly together, the sealing ring 9 being crushed as a result. Rotation of the rod 20 in an opposite direction after the clip 19 has been engaged with the rod 20 enables the lid 2 to be released from the bowl 1.

The spring clip 19 is made of bent wire and comprises two hook-like ends 29 interconnected by the central portion 28 which is appropriately curved so that it can be fitted into and lie wound partially around the rod 20 in the helical groove 27. The hooked ends 29 are of such a size that they can be snap-fitted over the enlarged heads of the pips 18.

The actuator 21 comprises a member with a hollow cylindrical stem which is integral with a head 30. The head 30 is either formed with a slot 31 so that it can be rotated by a coin or screwdriver, or is provided with webs so that it can be rotated by hand. The overall size of the actuator 21 is such that it can be fitted into the columnar portion 7 of the bowl 1 from the open bottom of the latter. This open bottom can be covered by a plate 32 through which the actuator extends as shown in FIG. 1.

In order to fasten the lid 2 to the bowl 1 the following operations are carried out. Firstly, the lid 2 is located on the bowl 1 so that the sealing ring 9 seats on the rim 8 of the bowl 1 in which position the aperture 16 will lie directly over the aperture 17 in the column 7 of the bowl. The actuator 21 to which the rod 20 is attached is then inserted into the columnnular portion 7 so that the bifurcate end 26 of the rod 20 projects upwardly through the dished member 14 and the flange 22 abuts the rim defining the aperture 17. The spring clip 19, which is snap fitted to the pips 18, is engaged within the groove end 26 of the rod 20 and the actuator 21 is rotated by means of a coin or screw driver inserted into the slot 31. This rotation forces the central portion 28 of the clip 19 to move along in the helical grooves 27 in the bifurcate end 26 of the rod 20. In this way the lid 2 is securely fastened to the bowl 1, the sealing ring 9 ensuring a fluid-tight joint.

To prevent leakage of steam and water from the kettle from the central connection of the lid 2 and the bowl 1, a second sealing ring 33 is provided located in a groove formed in the dished member 14. On connection of the lid 2 to the bowl 1 the column 7 is forced into sealing contact with the ring 33.

To prevent tampering with the spring clip 19 and its attachment to the pips 18 the plate 13 is fitted into the lid 2 to close the chamber 14. It will be appreciated that the clip 19 can be detached from the bowl 1 after fitment but this requires a special tool and cannot be readily carried out by unauthorised persons.

The advantage of this method of fastening the lid 2 to the bowl 1 is its simplicity of construction and operation enabling the lid 2 to be removed from the bowl 1 simply when desired for cleaning purposes. Additionally, the fastening is located above the recommended upper water level for the kettle. It will be appreciated that in a modification, the spring clip 19 could be attached to the bowl 1 and engage with a screw threaded rod similar to rod 20 attached to the lid 2.

Turning now to the water level indicator as shown in FIGS. 1, 2 and 3, this comprises a float arrangement which registers the quantity of water in the kettle by a lever system. A hollow blow-moulded float 34 is snap-fitted to a lever 35 which is itself snap-fitted to a depending portion 36 of the lid 2 of the kettle, inwardly of the spout 6. The lever 35 as can be seen in FIG. 2 has a substantially rectangular shape, the float 34 lying contiguous with one horizontal disposed side 37 thereof and the opposing side 38 being snap-fitted into jaws 39 formed on said portion 36. This fitment enables the lever 35 to pivot upwardly and downwardly with the float 34 as the water level within the kettle varies as shown in FIG. 1.

Snap-fitted to the side 37 of the lever 35 is one end 40 of a strut 41. The other end 42 of the strut 41 rides in an inclined elongated slot 43 formed in the handle 11 of the kettle. At the end 42 of the strut 41 is a head 44 which forms an indicator for the level of the water in the kettle and prevents the strut 41 from falling out of or sliding down the slot 43 as the struct 41 moves. A scale 45 is provided along the length of the slot as shown in FIG. 3 against which the head 44 travels.

In use, when the water level within the kettle is low the float 34 occupies a position as shown in dashed lines in FIG. 1 which causes the lever 35 to lie acutely with respect to a vertical plane and the head 44 of the strut 41 to lie near the bottom of the slot 43 and thereby the scale 45. As the water level inside the kettle rises, the float 34 floats upwardly and pivots the lever 35 towards a horizontal attitude, as shown in solid lines in FIG. 1. The strut 41 is also forced to move and the head 44 rides upwardly in the slot 43 to indicate a different water level on the scale 45.

In this way a simple method of indicating the water level within the kettle is accomplished and which can also include indications when the water level is too low or too high for safety or damage to the kettle.

The electric element 3 is secured to the lid 2 by means of screws 46 opposite to the spout 6 and comprises a first horseshoe-shaped portion 47 which lies within the bowl 1 around the column 7 and two vertical stems 48 which are attached to the lid 2 by the screws 46. As is described below, the electric element 3 is electrically connectable to the socket arrangement 4 for the supply of power thereto. Within the socket arrangement 4 is a cut-out arrangement so that the electricity supply to the element 3 is automatically cut off when the water in the kettle reaches boiling point. However, attached to the element 3 is a second cut-out arrangement 49 whereby the element 3 can be cut off from the electricity supply should the kettle boil dry. This second arrangement 49 will now be described.

Figure 5:
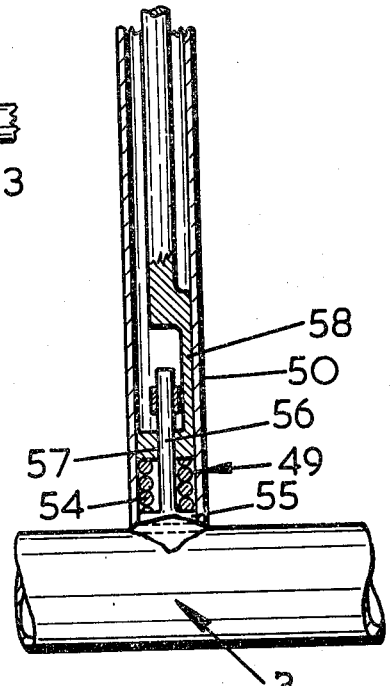
FIG. 5 is a sectional view, to an enlarged scale, on the line V—V in FIG. 1.

Brazed to the first portion 47 of the electric element 3 adjacent the stems 48 is a vertical tube 50 so that the interior of the tube is water tight. The upper end of the tube 50 communicates with a chamber 51 formed within the handle 11 of the kettle via an aperture 52 in the lid 2. The aperture 52 around the tube 50 is sealed by a gasket 53 which is interposed between the element 3 around the tube 50 and the lid 2, and through which the screws 46 pass. As shown in FIG. 5, within the tube 50 is located a shape memory effect actuator 54 which is coiled in the manner of a spring. The actuator 54 is located at the base of the tube 50 and rests at its lower end on a shoe 55, which is made of a good heat conductor such as copper. A projecting stem 56 of the shoe 55 is arranged to lie axially through the actuator 54 and passes through an aperture 57 formed in a link 58 arranged to rest on the upper end of the actuator 54. The link 58 is formed so that it passes around the projecting stem 56 and then lies axially along the tube 50, passing through the aperture 52 and up into the chamber 51.

Within the chamber 51, the link 58 passes into a bore 59 formed in a portion of the handle 11 defining the chamber 51 and is attached therein to an enlarged head 60 formed at one end of a stem 61 projecting from a push button 62. Around the circumference of the head 60 is attached a leaf spring 63 the rim of which engages in an annular groove 64 formed in an enlarged portion of the bore 59. This spring 63 comprises an over centre spring so that there are two stable positions for the push button 62, one wherein it lies completely within the handle 11 as shown in FIG. 1 and one wherein it projects from the top of the handle 11.

Adjacent the push button 62, the handle 11 is configured to provide a first well 65 in which the socket arrangement 4 can fit and into which project three electrical connecting pins 66 from the handle 11 to engage with the arrangement 4. The upper pin 66 comprises an earth pin and is connected internally of the handle 11 via a wire 67 to one of the screws 46 connecting the element 3 to the lid 2. In this way the earth lead for the kettle is in electrical contact with the lid 2 and thereby the bowl 1. The live pin 66 is directly connected via a wire 68 to a contact (not shown) which contacts one electrical connecting post 69 of the electric element 3 which projects through the lid 2 into the chamber 51. The other electrical connecting post 70 of the element 3, which likewise projects into the chamber 51, is connected via a contact 71 and a screw 72 to a leaf spring 73 which projects from the head 60 of the push button 62. When the push button 62 is in the position shown in FIG. 1, the leaf spring 73 makes electrical contact with a projecting bar 74 which is fixed to the handle 11 and to which the neutral pin 66 is connected via a wire 75. However, when the push button 62 is in its other stable position wherein it projects from the handle 11, the leaf spring 73 is raised above the bar 74 and does not make electrical contact therewith.

It will be appreciated that in use, with the electric element 3 connected to an electricity supply via the socket arrangement, as is described below, that should the kettle boil dry, the temperature of the shoe 55 will rise and heat the actuator 54. When the temperature of the actuator 54 is sufficiently high, that is a temperature above the boiling point of water, the actuator 54 will operate by expanding longitudinally. This cases the link 58 to be pushed upwardly in the tube 50 and thereby act to push the head 60 of the push button 62 upwardly against the bias of the spring 63. However, once the spring 63 has passed over centre, it moves into its second stable position and retains the button 62 projecting from the handle 11. In this second position, the electrical contact between the leaf spring 73 and the bar 74 is broken, so cutting off the supply of electricity to the element 3.

Thereafter, the kettle can be reset once the temperature therein has cooled and the actuator 54 returned to its original size by depressing the push button 62 to force the spring 63 back into its original stable position, thus re-establishing the electrical contact between the spring 73 and the bar 74.

Turning now to the socket arrangement 4, this comprises an outer plastics body 76 which is provided with two projecting portions 77 that engage in the handle 11 of the kettle. The upper projecting portion 77 can be inserted into the well 65 and is provided with three metallic electrically conducting sleeves 78 in which the pins 66 can locate to connect the pins 66 electrically to a lead 79 attached to the arrangement 4. The lower portion 77 is adapted to engage in a second well 80 formed in the handle 11 beneath the well 65.

The second well so defines an aperture 81 in the lid 2 of the kettle, which aperture 81 when the arrangement 4 is plugged into the handle 11 registers with an aperture 82 formed in the portion 78 thereof. Hence, steam from the interior of the bowl 1 can pass through the apertures 81 and 82 into the lower portion 77 of the socket arrangement 4. The interior of this portion 77 of the arrangement 4 is sealed off from the rest of the interior of the arrangement substantially by an internal partition 83, thus defining a chamber 84. To permit steam which has entered the chamber 84 to egress therefrom, a second aperture 85 is provided but which does not communicate with the interior of the bowl 1. Within the chamber 84 is located a second shape memory effect actuator 86 which is again coiled in the manner of a spring. Attached to the actuator 86 by a plate 87 is a push rod 88 which lies axially with respect to the actuator 86 and the free end 89 of which passes through a hole 90 formed in the partition 83 to project into the interior of the rest of the arrangement 4. To prevent steam from the chamber 84 passing through the hole 90, a seal 91 is located around the rod 88.

The actuator 86 is adapted to increase in length when heated to the boiling point of water. Hence, in use, when steam passes through the chamber 84 via the apertures 81, 82 and 85 the actuator 86 is heated and operates to thrust the rod 88 through the hole 90 to project further into the adjacent interior of the arrangement 4.

Figure 6:
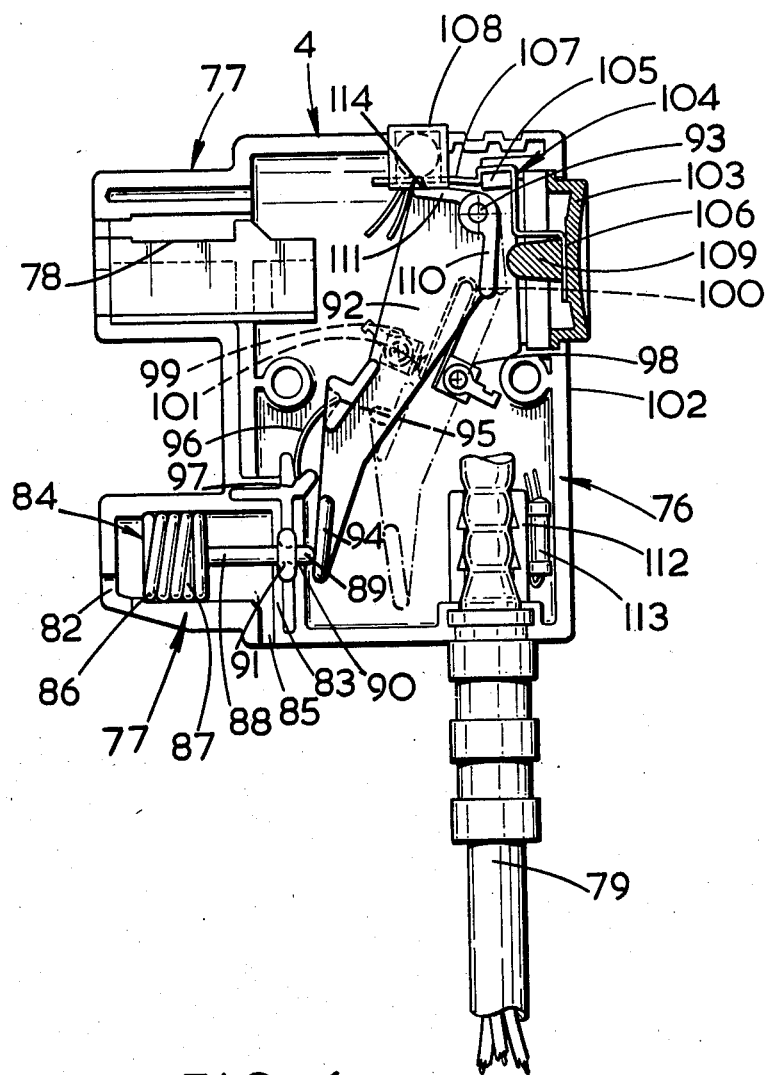
FIG. 6 is a sectional view, to an enlarged scale, of a socket arrangement for the kettle as shown in FIG. 1.

Within the main body 76 of the arrangement 4 is located a lever 92 which is pivotally mounted as at 93 at one end in the upper portion of the body 76. The other end of the lever 92 comprises a foot 94 against which, in a first stable position of the lever 92, the end 89 of the rod 88 bears. Adjacent the foot 94, the lever 92 is provided with a recess 95 in which locates one end of a leaf spring 96, the other end of which locates in a recess 97 formed in the body 76 adjacent the partition 83. This spring 96 is bowed and acts on the lever 92 to retain it in said first position in engagement with the rod 88. However, when the rod 88 thrusts against the lever 92 and pivots same, the spring 96 is altered in position and tends to thrust the lever 92 further from the rod 88 into a second stable position, as shown in dashed lines in FIG. 6.

At the central region of the body are located two connectors 98 and 99 which are interconnected by a leaf spring 100. The leaf spring is U-shaped and one arm is attached to the connector 98 and the other arm bears against a contact 101 of the connector 99. Located adjacent the spring 100 on the lever 92 is a projecting peg (not shown) which, when the lever 92 is moved out of the first position into the second position, strikes the said other arm of the spring 100 and moves out of contact with the contact 101. The bias of the spring 100, therefore, balances the bias of the spring 96 in the second stable position of the lever 92.

In the end face 102 of the body 76 opposite the projecting portions 77 and 78 is a push button 103. This button 103 is biassed outwardly of the body 76 by a leaf spring 104, which is cranked and located in position within the body 76 around a bar 105. One arm 106 of the spring 104 bears against the button 103 and the other arm 107 of the spring 104 bears against a second push button 108 which is located in the upper face of the body 76 and again biasses the button 108 outwardly of the body 76.

The button 103 is provided internally of the body 76 with a push rod 109 which, when the button 103 is pressed inwardly, strikes a shoe 110 adjacent the pivot point 93 of the lever 92 and forces the lever to move from its second stable position into its first stable position. Likewise, the button 108 when depressed strikes a shoe 111 adajcent the pivot point 93 and forces the lever 92 to move from its first into its second stable position.

The lead 79 enters the socket arrangement at the base of the body 76 and is gripped by an internal sleeve 112. The earth and live wires (not shown) of the lead 79 are connected directly to the appropriate sleeves 78 but the neutral wire is connected to the connector 98 and the connector 99 is then connected to the neutral sleeve 78. Hence the supply of electricity from the socket arrangement 4 depends on the position of the lever 92 which controls whether the leaf spring 100 makes contact between the connectors 98 and 99.

In use, it is convenient to form the push button 108 by a neon light. This can be powered by a circuit arranged in parallel with the supply circuit to the sleeves 78 via a resistor 113. The light can be used to indicate when power is being supplied by the socket arrangement and so that the light is on when the lever 92 is in its first position and off when in its second position, the shoe 111 is provided with a contact 114 connected into the supply circuit for the light which makes a circuit with an adjacent contact (not shown) on the button 108 when the lever 92 in its first position.

When it is desired to use the kettle, the bowl 1 is filled via the spout 6 to the desired level as indicated by the indicator arrangement 5. The element 3 of the kettle is then connected to an electricity supply, such as a mains supply via the socket arrangement 4 which is plugged into the handle 11 of the kettle and connected via the lead 79 to the supply. To switch the kettle on, the push button 103 should be pressed to ensure the lever 92 is in its first position and the connectors 98 and 99 in electrical contact. When the water in the kettle boils, the steam in the bowl 1 escapes therefrom in part by passing through the apertures 81 and 82 so that the actuator 85 is heated. When the actuator 85 reaches its predetermined temperature, it expands and forces the push rod 88 to move and strike the foot 94 causing the lever 92 to move from the first into the second position. Hence, the electrical contact between the connectors 98 and 99 is broken and the electrical power supply to the element 3 is cut off. Likewise the neon light is extinguished.

To reset the kettle after the actuator 85 has cooled and returned to its original size, then the button 103 must be pressed to move the lever 92 back to its first position. Alternatively, if it is desired to switch off the power supply to the element 3 before the boiling point of the water has been reached, then the push button 108 can be pressed to force the lever 92 out of the first position into its second position.

Should the actuator 85 fail or the kettle be connected to the electricity supply without being filled with water, then the actuator 54 will operate in the manner described above to cut off the electricity supply to the element 3.

The kettle of the present invention as described above has several advantages over existing kettles. Firstly, the attachment of the element 3 to the lid 2 and the detachable nature of the lid 2 enables the bowl 1 to be easily manufactured and completely emptied so that it can be cleaned easily. This is particularly important in hard water regions where the kettle will tend to fur up. Secondly, the removability of the element 3 from the bowl 1 permits the element 3 to be easily replaced, if necessary. The shape memory effect actuators 54 and 85 are reliable and give a quick response once their respective predetermined operating temperatures are reached. However, it will be appreciated that these could be replaced by other conventional forms of actuator. Additionally, whilst it is advantageous to operate the kettle via the socket arrangement 4, a simple socket could be used without the facility of the cut-out therein. However, the boil-dry cut out would still be provided as a safety feature as it forms part of the kettle handle 11.

What is claimed is:

1. An electric kettle comprising a bowl, a lid for closing the bowl, a spout through which the bowl can be filled with water, and electrical heating element which is connected to the lid and suspended within the bowl when the lid is fitted on the kettle, means whereby the element can be connected to an electricity supply, and a cut-out arrangement for the heating element comprising a switch operable by a shape memory effect actuator, which is located within the bowl adjacent the element and on attainment of a predetermined temperature, greater than the boiling temperature of water, changes its physical shape sufficiently to operate the switch and thereby prevent the element being supplied with current from the supply.

2. A kettle as claimed in claim 1, in which a further cut-out arrangement is provided comprising a further switch via which the element is connected to and disconnected from the electricity supply, and a further shape memory effect actuator which on attainment of a predetermined temperature changes its physical shape sufficiently to operate the said further switch and thereby prevent the element being supplied with current from the supply.

3. A kettle as claimed in claim 2, in which after the actuator has operated to disconnect the electricity supply from the element the switch can be manually reset, a manual override being provided for the switch whereby the element can be disconnected from the electricity supply independently of the operation of the actuator.

4. A kettle as claimed in claim 2, in which a plug and socket arrangement is provided whereby the element can be detachably connected to an electrical lead for connection to an electricity supply, said arrangement comprising a body detachable from the element within which the said further cut-out arrangement is located.

5. A kettle as claimed in claim 4, in which when the body is connected to the element by the plug and socket arrangement, a pathway for steam is provided from the bowl into said body to pass around the actuator, which actuator is adapted to operate on attainment of the boiling temperature of water, whereby the electricity supply to the element is cut-off when water in the bowl boils.

6. A kettle as claimed in claim 1, in which the actuator operates the second switch by means of a link in combination with an over-centre spring arrangement, whereby the link has two stable positions corresponding respectively to on and/or off positions of the switch, and means whereby the link can be moved manually to reset the switch in an on position are provided wherein the element can be supplied with current from the supply.

7. A kettle as claimed in claim 1, in which the bowl has an upraised column in combination with a first fastening means, and the lid has second fastening means complementary to said first fastening means to which the first fastening means can be detachably coupled to anchor the lid to the bowl.

8. A kettle as claimed in claim 7, in which the column is hollow and houses a manually operable actuator attached to the first fastening means which are engageable via registering holes in the column and the lid with the second fastening means, the actuator enabling the lid to be attached and detached from the bowl as desired.

9. A kettle as claimed in claim 8, in which the second fastening means comprises a spring clip which is attached to the lid and is engageable in a helical groove defined in a rod which is connected to the actuator and forms the first fastening means to anchor the lid to the bowl.

10. A kettle as claimed in claim 1, in which a water level indicator is provided comprising a float located within and pivotally attached to the body of the kettle, a visible scale for indicating the level of water within the kettle, and indicator means disposed between the float and the scale whereby as the water level within the kettle varies the float pivots upwardly or downwardly and acts on said means to move same along the scale.

11. A kettle as claimed in claim 10, in which the indicator means comprises a first lever one end of which is pivotally attached to a second lever attaching the float to the body of the kettle, and the other end of which rides in a slot in the body of the kettle along an edge of which slot the scale is disposed thereby to indicate the water level within the kettle.

* * * * *